(12) United States Patent
Liu et al.

(10) Patent No.: US 6,950,748 B2
(45) Date of Patent: Sep. 27, 2005

(54) METHODS AND SYSTEMS FOR RESISTIVITY ANISOTROPY FORMATION ANALYSIS

(75) Inventors: Cheng Bing Liu, Houston, TX (US); Qiming Li, Sugar Land, TX (US); Frank P. Shray, Sugar Land, TX (US); Jacques Tabanou, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 224 days.

(21) Appl. No.: 10/604,492

(22) Filed: Jul. 25, 2003

(65) Prior Publication Data

US 2005/0114030 A1 May 26, 2005

Related U.S. Application Data

(60) Provisional application No. 60/319,479, filed on Aug. 19, 2002.

(51) Int. Cl.[7] .............................................. G01V 3/38
(52) U.S. Cl. ......................................... 702/7; 324/339
(58) Field of Search .............................. 702/7, 11, 14; 324/339, 338, 343; 707/7; 367/18; 703/10, 703/14

(56) References Cited

U.S. PATENT DOCUMENTS

| | | | | |
|---|---|---|---|---|
| 3,166,709 A | | 1/1965 | Doll ............................. 324/339 |
| 5,461,562 A | | 10/1995 | Tabanou et al. ............... 702/11 |
| 5,550,473 A | | 8/1996 | Klein ........................... 324/339 |
| 5,656,930 A | | 8/1997 | Hagiwara ..................... 324/339 |
| 5,835,883 A | * | 11/1998 | Neff et al. ....................... 702/7 |
| 5,883,515 A | * | 3/1999 | Strack et al. ................ 324/339 |
| 5,886,526 A | | 3/1999 | Wu ............................... 324/338 |
| 5,966,013 A | | 10/1999 | Hagiwara ..................... 324/339 |
| 6,092,024 A | | 7/2000 | Wu ................................. 702/7 |
| 6,218,841 B1 | | 4/2001 | Wu ............................... 324/338 |
| 6,393,364 B1 | * | 5/2002 | Gao et al. ....................... 702/7 |
| 6,556,016 B2 | * | 4/2003 | Gao et al. .................... 324/343 |
| 2002/0149997 A1 | | 10/2002 | Zhang et al. .................. 367/18 |
| 2003/0018434 A1 | | 1/2003 | Kriegshauser et al. ......... 707/7 |

OTHER PUBLICATIONS

Shray, Frank et al., Evaluation of Laminated Formations Using Nuclear Magnetic Resonance and Resistivity Anisotropy Measurements, SPE 72370, Oct. 17-19, 2001, pp. 1-17.

* cited by examiner

*Primary Examiner*—John Barlow
*Assistant Examiner*—Victor J. Taylor
(74) *Attorney, Agent, or Firm*—Victor H. Segura; Brigitte L. Echols

(57) ABSTRACT

Techniques for determining a formation property by simplifying various two-geological-layer or multi-geological-layer models into a multi-electrical-layer model. A volume fraction of a layer in a multi-electrical-layer model is determined for an anisotropic region (sliding window) of the formation. The multi-electrical-layer electrical model includes a relative-lower-resistivity layer and a relative-higher-resistivity layer. A high-resolution resistivity measurement is used in the determination and resistivities for the relative-lower-resistivity layer and for the relative-higher-resistivity layer based on the volume fraction and bulk resistivity measurements of the anisotropic region are determined. The formation property is based on the volume fraction, the resistivity of the relative-lower-resistivity layer, the resistivity of the relative-higher-resistivity layer, a total porosity of the anisotropic region, and bulk resistivity measurements of the region.

24 Claims, 3 Drawing Sheets

METHODS AND SYSTEMS FOR RESISTIVITY ANISOTROPY FORMATION ANALYSIS

CROSS REFERENCE TO RELATED APPLICATIONS

This application claims priority pursuant to 35 U.S.C. §119 of U.S. Provisional Application Ser. No. 60/319,479 filed on Aug. 19, 2002. This provisional application is hereby incorporated by reference in its entirety.

BACKGROUND OF INVENTION

1. Field of the Invention

The invention relates generally to the analysis of underground earth formations, and, more particularly, to the determination of formation resistivity and hydrocarbon saturation.

2. Background Art

The localization and quantification of low resistivity pay (sometimes known as low contrast pay) is a primary goal of oil and gas exploration. Hydrocarbon saturations or bulk hydrocarbon volume (BVH) in subsurface isotropic and homogeneous rocks are usually estimated through the use of Archie type equations, which relate the porosity and water saturation in the pore space of the rock to the resistivity of the rock. For example, BVH in a formation may be determined from the total porosity ($\phi_T$) and the total water saturation ($S_{wt}$) of the formation according to the relationship: $BVH=\phi_T(1-S_{wt})$. While the total porosity ($\phi_T$) may be determined with various tools (e.g., NMR, neutron, density, sonic etc.), the total water saturation ($S_{wt}$) often is derived from resistivity and porosity measurements, using the Archie equation or its variants (generally referred to as "Archie equations"). This approach of deriving $S_{wt}$ from resistivity and porosity measurements usually works satisfactorily once the parameters of the equations are fine tuned with measurements or tests performed in the area. However, this approach of using Archie equations to derive $S_{wt}$ breaks down with relation to anisotropic formations, and new methods are needed in this situation.

Formation resistivity can be measured with conventional logging instruments equipped with electrodes (laterologs) or antennas that can transmit a current or electromagnetic (EM) energy into earth formations (induction/propagation logs). The instruments are disposed within a borehole traversing the formations and energy is transmitted into the formations to interact with the conductive media in the formations. With laterologs, a current (or voltage) is injected (or applied) into a formation using a first pair of electrodes and a second pair of electrodes are typically placed at a distance from the first pair of electrodes to measure the voltage drop or current flow between the second pair of electrodes. The measured voltage drop or current flow may then be used to derive the resistivity (or its inverse, conductivity) of the formation.

With induction/propagation logging, EM energy is transmitted into a formation to induce eddy currents in the formation. The eddy currents flow in loops that lie in planes perpendicular to the magnetic dipole of the transmitting antenna. The magnitudes of the eddy currents depend on the conductivities of the formation. The eddy currents in turn induce secondary magnetic fields, the magnitudes of which depend on the magnitudes of the eddy currents. Therefore, by measuring the magnitudes of the secondary magnetic fields (using a receiver antenna), it is possible to indirectly determine the resistivity of the formation around the transmitter and receiver antennas.

Resistivities of earth formations depend on the amounts and types of fluids included in the pores therein. Thus, different formations may have different resistivities due to different porosities, and/or different amounts or types of fluids included therein. When the formation is isotropic and homogeneous, its electric properties are constant regardless of the direction of the measurements. However, earth formations often comprise geological (sedimentation) layers that may have different petrophysical properties (e.g., porosities, saturations, grain sizes etc.), and hence electrical properties. Consequently, resistivity measurements may produce different results when measured in different directions. This phenomenon is referred to as formation (electrical) anisotropy.

In a typical situation, a borehole may be drilled through multiple sedimentation layers in a direction perpendicular to the layers, i.e., a vertical well with no formation dip. In such a vertical well, a resistivity measurement along a direction parallel the borehole axis is referred to as a vertical resistivity ($R_v$) because the measurement is made in a direction perpendicular to the sedimentation layers. In the vertical resistivity measurements, the current paths run through various sedimentation layers, which act like different resistors connected in series. Therefore, the apparent resistivity of the formation ($R_v$) is a summation of resistivities contributed by individual layers. For example, as described below by the present invention, in a two-electrical-layer model comprising a relative-ower-resistivity layer and a relative-higher-resistivity layer finely interlaced together, $$R_v = R_{lr}VF_{lr} + R_{hr}VF_{hr}, \quad (1)$$

where $R_v$ is the measured (apparent) vertical resistivity, $VF_{lr}$ and $R_{lr}$ are the volume fraction and resistivity of the relative-lower-resistivity layer, and $VF_{hr}$ and $R_{hr}$ are the volume fraction and resistivity of the relative-higher-resistivity layer. As seen from Equation (1), the vertical resistivity measurements ($R_v$) would be dominated by more resistive layers (e.g., hydrocarbon-bearing layers). In contrast, highly conductive thin layers (e.g., brine-bearing layers) may be obscured by the more resistive layers in such measurements.

In contrast, if a resistivity measurement is performed along a direction perpendicular to the borehole axis (or equivalently parallel to the beddings) in such a vertical well, it is referred to as horizontal resistivity ($R_h$) because the measurement is made along the sedimentation planes. Note that the "horizontal" and "vertical" used herein are with respect to the sedimentation layers, rather than with respect to the borehole axis. In horizontal resistivity measurements in a vertical well, currents flow in planes perpendicular to the borehole axis, i.e., within sedimentation layers. Thus, each individual sedimentation layer provides a conductive path for the currents, i.e., the sedimentation layers form parallel circuits. As a result, the measured conductance ($1/R_h$) is a summation of the conductivities of the sedimentation layers within the region of investigation. For example, in the electrical-layered model comprising relative-lower-resistivity and relative-higher-resistivity layers, $$\frac{1}{R_h} = \frac{VF_{lr}}{R_{lr}} + \frac{VF_{hr}}{R_{hr}} \quad (2)$$

where $R_h$ is the horizontal resistivity, $VF_{lr}$ and $R_{lr}$ represent the volume fraction and resistivity of the relative-lower-resistivity layer, and $VF_{hr}$ and $R_{hr}$ represent the volume fraction and resistivity of the relative-higher-resistivity layer, respectively. As seen from Equation (2), the measured horizontal conductivity ($R_h$) would be dominated by the most conductive layers, while thin non-conductive hydrocarbon-bearing layers may become "invisible" to the horizontal resistivity measurements. This is known as the low resistivity pay problem.

As mentioned above, either the conductive layers or the resistive layers could be "missed" in the resistivity measurements depending on the direction of the measure ments, in the sense that their presence has only a small effect on the apparent resistivity. Thus, formation resistivity anisotropy presents a problem in formation evaluation. Many reservoir rocks exhibit resistivity anisotropy. Several mechanisms can produce the anisotropy, among which are very thin sand (carbonate)-shale laminations, grain size changes in clean sandstone, wind-distributed sands (aeolian formations), cementing (porosity) changes in sandstone and so on. See Rubin, D. M., *Cross bedding, bed-forms, and paleocurrents*, Society Of Economic Paleontologists And Mineralogists, Concepts In Sedimentology And Paleontology, 1; Klein et al., *The petrophysics of electrically anisotropic reservoirs*, Transactions of the SPWLA Thirty-Sixth Annual Logging Symposium, Paris, France, Jun. 26–29, 1995, paper HH.

Over the years, most of the homogeneous or thick-layer oil and gas reservoirs have been discovered. As a result, many reservoirs comprise thin layers of pay zones. With technology advances such as directional and horizontal drilling, it is becoming economical to produce in thin reservoirs that traditionally would have been ignored. The industry has also begun to realize the importance of thinly laminated reservoirs that have been by-passed due to low apparent resistivity in vertical wells. Therefore, a need exists for methods that can accurately predict the hydrocarbon contents of thinly laminated reservoirs.

Evaluation of thinly laminated reservoirs is not a new problem in formation evaluation and interpretation. See U.S. Pat. Nos. 3,166,709 and 5,461,562, assigned to the present assignee. The horizontal and vertical resistivities of anisotropic formations can be evaluated by wireline or logging-while-drilling (LWD) EM measurements in highly deviated wells. See Hagiwara T., *A New Method to Determine Horizontal-Resistivity in Anisotropic Formations with Prior Knowledge of Relative Dip*, Transactions of the SPWLA Thirty-Seventh Annual Logging Symposium, Jun. 16–19, 1996, Paper Q; U.S. Pat. Nos. 5,966,013, 6,092,024, 5,886, 526, 6,218,841. Recent techniques using tri-axial EM tools and the combination of EM tools with laterolog tools have made it possible to measure the vertical and horizontal resistivities in vertical wells. However, it remains a difficult task to relate the measured resistivities ($R_v$ and $R_h$) to the bulk hydrocarbon volume because the traditional Archie relation does not apply to anisotropic formations.

Several papers have been published dealing with analyses of anisotropic formations. See Klein et al., *The Petrophysics of Electronically Anisotropic Reservoirs*, Transactions of the SP-WLA Thirty-Sixth Annual Logging Symposium, Jun. 26–29, 1995, Paper HH; Tabanou et al., *Which Resistivity Should Be Used To Evaluate Thinly Bedded Reservoirs at High Angle?* Transactions of the SPWLA Fortieth Annual Logging Symposium, May 30–Jun. 3, 1999, Paper E; Shray F. and Borbas T., *Evaluation of Laminated Formations Using Nuclear Resonance and Resistivity Anisotropy Measurements*, SPE Eastern Regional Meeting, Canton, Ohio 17–19 October 2001; U.S. Pat. No. 5,550,473.

These papers propose methods for determining electrical properties of anisotropic formations. As shown in Equations (1) and (2), four parameters ($VF_{hr}$, $R_{hr}$, $VF_{lr}$, and $R_{lr}$) are determined in order to define the electrical properties of a two-layer model. With $$VF_{hr}+VF_{lr}=1, \quad (3)$$

there are four unknowns and three equations. Note that $R_h$ and $R_v$ are assumed known parameters that can be determined from resistivity measurements. Thus, one additional parameter is needed to solve these equations.

Depending on the additional parameter that is used to solve these equations (hence, electrical properties of the formation layers), conventional methods may be categorized as the $$R_v\text{-}R_h\text{-}\phi_r\text{-}R_{sh}$$

method, the $$R_v\text{-}R_h\text{-}\phi_r\text{-}V_{sh}$$

method, and the $$R_v\text{-}R_h\text{-}\phi_T\text{-}BFV$$

method, where $R_{sh}$, $V_{sh}$ and BFV are shale resistivity, shale content, and bound fluid volume, respectively. Once the electrical properties of the formation layers (e.g., $R_{hr}$ and $R_{lr}$) are known, they can be used together with the total porosity ($\phi_T$) of the formation to determine the total water saturation ($S_{wt}$). The total water saturation ($S_{wt}$) and total porosity ($\phi_T$) may then be used to determine the bulk hydrocarbon volume (BVH) according to the relationship BVH= $\phi_T(1-S_{wt})$. It is assumed that a reliable technique exists for the water saturation evaluation of each of the individual homogeneous layers in the layered model. The Archie relation is typically assumed applicable in the individual layers.

The additional parameter used in these methods is either obtained from other types of measurements (e.g., NMR, GR) or assumed to be the same as the value determined in a thick layer of the same composition. However, these assumed values may not accurately represent the values of the same types of layers in thin laminations. In addition, these methods are based on assumptions of formation geological compositions and petrophysical properties (i.e., grain sizes or porosities). If the formation has a different composition or property from that assumed, these methods cannot provide accurate estimates of electrical properties of the formation layers. As a result, the derived $S_{wt}$ and BVH may not be accurate.

Thus a need remains for improved techniques that can provide accurate $S_{wt}$ and BVH estimates without prior knowledge of the properties of the thin layers of the formation.

SUMMARY OF INVENTION

One aspect of the invention provides a method for determining a subsurface formation property. The method includes determining a volume fraction of a layer in a multi-electrical-layer model for an anisotropic region of the formation, wherein the multi-electrical-layer model includes a relative-lower-resistivity layer and a relative-higher-resistivity layer and the determining is based on a resistivity measurement; determining a resistivity for the relative-lower-resistivity layer and a resistivity for the relative-higher-resistivity layer based on the volume fraction and bulk resistivity measurements of the anisotropic region, wherein the bulk resistivity measurements include a horizontal resistivity measurement or a vertical resistivity measurement; and determining the formation property based on the volume fraction, the resistivity of the relative-lower-resistivity layer, the resistivity of the relative-higher-resistivity layer, a porosity measurement of the anisotropic region, and the bulk resistivity measurements.

Another aspect of the invention provides a system for determining a subsurface formation property. The system includes a computer system adapted to process a program including instructions for: determining a volume fraction of a layer in a multi-electrical-layer model for an anisotropic region of the formation, wherein the multi-electrical-layer model comprises a relative-lower-resistivity layer and a relative-higher-resistivity layer and the determining is based on a resistivity measurement; determining a resistivity for the relative-lower-resistivity layer and a resistivity for the relative-higher-resistivity layer based on the volume fraction and bulk resistivity measurements of the anisotropic region, wherein the bulk resistivity measurements include a horizontal resistivity measurement or a vertical resistivity measurement; and determining the formation property based on the volume fraction, the resistivity of the relative-lower-resistivity layer, the resistivity of the relative-higher-resistivity layer, a porosity measurement of the anisotropic region, and the bulk resistivity measurements.

Other aspects and advantages of the invention will be apparent from the following description and the appended claims.

DETAILED DESCRIPTION

Figure 1:
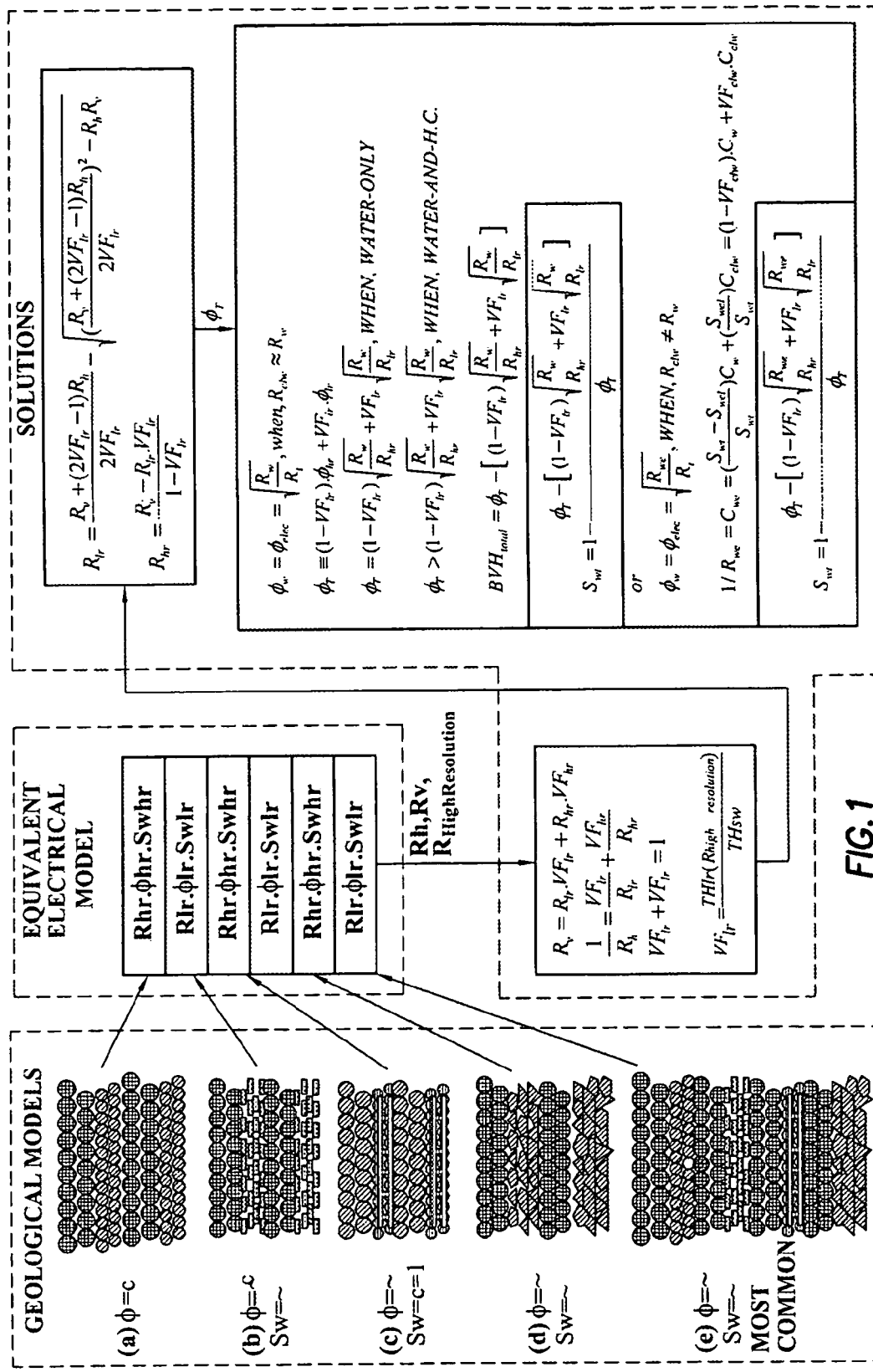
FIG. 1 shows geological models which can cause formation (electrical) anisotropy and their equivalent model (multi-electrical-layer model) in accord with the invention.

Embodiments of the invention relate to general methods and systems for determining a formation property such as a total water saturation ($S_{wt}$) from bulk resistivity measurements ($R_v$ and $R_h$) in anisotropic formations. The total water saturation ($S_{wt}$) together with the total porosity ($\phi_T$) may then be used to determine the bulk hydrocarbon volume (BVH). The disclosed techniques use formation models having layers with different electrical properties. These formation models are referred to as "electrical models," as opposed to the geological models of known techniques. The term "electrical" is used to indicate that the formation model corresponds to the electrical characteristics of the formation as opposed to a conventional geological model. Conceptually, the electrical model is based on the inherent electrical properties of the formation regardless of the geological properties. Although the electrical properties of a given layer are dependent on the composition of the formation, one need not know the makeup of the layer because the resistivity measurements sense the electrical properties of the formation rather than the chemical or physical compositions of the formation.

While embodiments of the invention use electrical models that are independent of actual formation compositions, conventional methods often rely on models that are specific to formations composed of particular compositions. For example, the $$R_v\text{-}R_h\text{-}\phi_T\text{-}R_{sh}$$

method assumes a two-geological-layer model comprising a sand layer and a shale layer. The sand layer comprises coarser grains and includes hydrocarbons in the pores, hence a higher resistivity. On the other hand, the shale layer comprises finer grains and often includes water in the pores, hence a lower resistivity.

In the $$R_v\text{-}R_h\text{-}\phi_T\text{-}R_{sh}$$

method, the additional parameter used to determine the resistivities of the two layers is the thin shale layer resistivity ($R_{shale}$), which is assumed to be identical to the resistivity ($R_{sh}$) determined in the nearby thick shale layer. The assumed $R_{sh}$ value ($R_{lr}$ in Equations (1) and (2)) together with $R_v$, $R_h$ are then used to compute $R_{hr}$ (i.e., $R_{sand}$ in this case) and $VF_{lr}$ (i.e., $VF_{shale}$ in this case). This model further assumes that the porosity of the sand layer is the same as that of the shale layer (hence, $\phi_{shale}=\phi_{sand}=\phi T$)

in order to determine $S_{wt}$ from the computed $R_{sand}$ and $R_{shale}$. The estimated $S_{wt}$ is then used to determine bulk hydrocarbon volume (BVH) according to the relationship:

$$BVH=\phi_T(1-S_{wt}).$$

$$BVH=_T(1-S_{wt}).$$

This method is accurate if the anisotropic formation indeed includes only shale and sand layers, i.e., this method depends on whether the studied formation is equivalent to the formation described in the sand-shale two-geological-layer model. Further, the $R_{shale}$ estimate obtained from nearby thick shale may not represent the true value of $R_{shale}$ in the thin layers, and the assumption that the porosities of the sand layer and the shale layer are identical may not be valid. Furthermore, this method impliedly assumes $R_{sand}>R_{shale}$, an assumption that may not be sand shale correct in some formations.

Similarly, the $$R_v\text{-}R_h\text{-}\phi_T\text{-}V_{sh}$$

method assumes that the volume fraction of the thin shale layers ($VF_{shale}$) is identical to the shale content ($V_{sh}$), i.e., $VF_{shale}=V_{sh}$. Based on this assumed $VF_{shale}$ (i.e., $VF_{lr}$ in Equations (1) and (2)) and the $R_v$ and $R_h$ measurements, $R_{hr}$ (i.e., $R_{sand}$ in this case) and $R_{lr}$ (i.e., $R_{shale}$ in this case) are then computed by solving Equations (1) (3). Next, this method assumes the porosity of the sand layer is identical to that of the shale layer (i.e., $\phi_{shale}=\phi_{sand}=\phi_T$)

in order to calculate $S_{wt}$ from the determined $R_{hr}$ and $R_{lr}$. The calculated $S_{wt}$ is then used to derive BVH.

Like the $$R_v\text{-}R_h\text{-}\phi_T\text{-}R_{sh}$$

method, the $$R_v\text{-}R_h\text{-}\phi_T\text{-}V_{sh}$$

method is typically accurate for anisotropic regions including only shale and sand layers. Furthermore, the shale content ($V_{sh}$) may not correctly represent the volume fraction of shale layers ($VF_{shale}$) if the shale layers include coarse grain non-clay-minerals such as quartz, and the sand layers include clay. This method also impliedly assumes $R_{sand} > R_{shale}$, an assumption that may not be correct in some formations.

The $$R_v\text{-}R_h\text{-}\phi_T\text{-}BFV$$

method uses the bound fluid volume (BFV) determined with other sensors (e.g., NMR) and the total porosity ($\phi_T$) to derive the volume fraction of the thin fine grain layers ($VF_{fg}$), i.e., $$VF_{fg} = BFV/\phi_T.$$

With $VF_{fg}$ (i.e., $VF_{lr}$ in Equations (1) and (2)) known, $R_{hr}$ (i.e., the resistivity of coarse grain layers $R_{cg}$ in this case) and $R_{lr}$ (i.e., the resistivity of the fine grain layers $R_{fg}$ in this case) can then be determined. This method further assumes that the porosity of the coarse grain layer is identical to the porosity of the fine grain layer (i.e., $\phi_{fg} = \phi_{cg}\phi_T$).

Based on this assumption, $S_{wt}$ is then calculated according to an equation similar to the Archie equation. The calculated $S_{wt}$ is then used to derive BVH.

The $$R_v\text{-}R_h\text{-}\phi_T\text{-}BFV$$

method is accurate for anisotropic formations including only shale and sand, or for formations in which one layer is a coarse grain clean reservoir with lower water saturation and the other layer is fine grain clean formation containing no hydrocarbons and both layers have the same porosity. Again, this method depends on whether the studied formation is equivalent to the formation described in the sand-shale two-geological-layer model or in the coarse-fine grain two-geological-layer model. Further more, the assumption that $$VF_{fg} = BFV/\phi_T$$

may not correctly represent the actual value of the volume fraction of fine grain (low-resistivity) layers, depending on whether the fine grain layers include free fluid or the coarse grain (high-resistivity) layers include bound water. This method also assumes "$\phi_{fg} = \phi_{cg} = \phi_T$"

and impliedly assumes "$R_{cg} > R_{fg}$", assumptions which may not be correct for some anisotropic formations.

In contrast to these conventional methods, embodiments of the invention use "electrical models" of formation layers. These electrical models do not rely on prior knowledge of the formation layer compositions. Therefore, embodiments of the invention may be generally applied in all formation types, regardless of the underlying mechanism (saturation changes, porosity changes or both) for the an isotropy.

A multi-electrical-layer model of the invention entails different types of "electrical" layers, including one having a relative higher resistivity and the other having a relative lower resistivity. Note that the multi-electrical-layer model refers to differing types of "electrical" layers, which may include more than two types of "geological" layers. The difference in resistivity between these electrical layers may arise from different porosities, different grain sizes, different formation fluids and/or different water saturations of the various types of geological layers.

An anisotropic formation according to a multi-electrical-layer model embodiment of the invention has bulk resistivity measurements ($R_v$ and $R_h$) as defined in Equations (1) and (2). Together with Equation (3), there are three equations and four unknowns. Therefore, one additional parameter is determined before the resistivities ($R_{hr}$ and $R_{lr}$) of the multiple layers are solved.

In accordance with embodiments of the invention, the additional parameter may be a volume fraction of the relative-lower-resistivity layers ($VF_{lr}$) or the relative-higher-resistivity layers ($VF_{hr}$). While embodiments of the invention may use either $VF_{lr}$ or $VF_{hr}$, for clarity the following description refers to $VF_{lr}$ only. In one embodiment of the invention, $VF_{lr}$ may be determined from a high-resolution resistivity measurement. The high-resolution resistivity measurement may be acquired with any conventional logging tool known in the art. Some of these tools do not provide accurate (absolute) resistivity measurements. Instead, they provide relative resistivities of the various layers in the formation. Embodiments of the invention may use high-resolution resistivity measure ments that include either absolute or relative resistivity values. Note that in accordance with the invention, the $VF_{lr}$ is determined from actual electrical measurements rather than using an assumed value or a value determined from non-electrical measurements as in prior methods.

In accordance with an embodiment of the invention, $VF_{lr}$ may be determined from the high-resolution resistivity measurement by finding the bed boundaries of the various layers and then assuming the thicknesses of the low-resistivity layers within an index interval (sliding window). The sliding window can be any size, but preferably larger than the vertical resolution provided by the resistivity measurement. A default size of the sliding window may be equal to the vertical resolution of a low-resolution resistivity tool which provides bulk resistivity measurements containing Rv and Rh signals.

Finding the bed boundaries from the high-resolution resistivity measurement may be accomplished by taking a derivative of a curve representing the high-resolution resistivity measurement as a function of the measurement depth (or borehole axial depth). The bed boundaries would appear as inflection points on the derivative curve. Once these inflection points are identified, the alternate layers defined by these points represent layers having the same resistivity (e.g., relative lower resistivity). Thus, the thicknesses of these layers may be summed to provide a volume fraction of the relative-lower-resistivity layers, $VF_{lr}$, for example.

FIG. 1 shows various geological models which can cause formation anisotropy and their equivalent multi-electrical-layer model according to embodiments of the invention. Since a source of the apparent formation anisotropy is that the thickness of any one of a group of (at least two) adjacent geological layers with different resistivity values is lower than the vertical resolution obtainable from the resistivity measurement within this group of layers, the multi-electrical-layer model can represent all the multi-geological layer models which may cause formation anisotropy. The difference between resistivity values among geological layers can be caused by different porosities or different saturations. In reality both porosity and saturation can be different in each of the layers.

Figure 2:
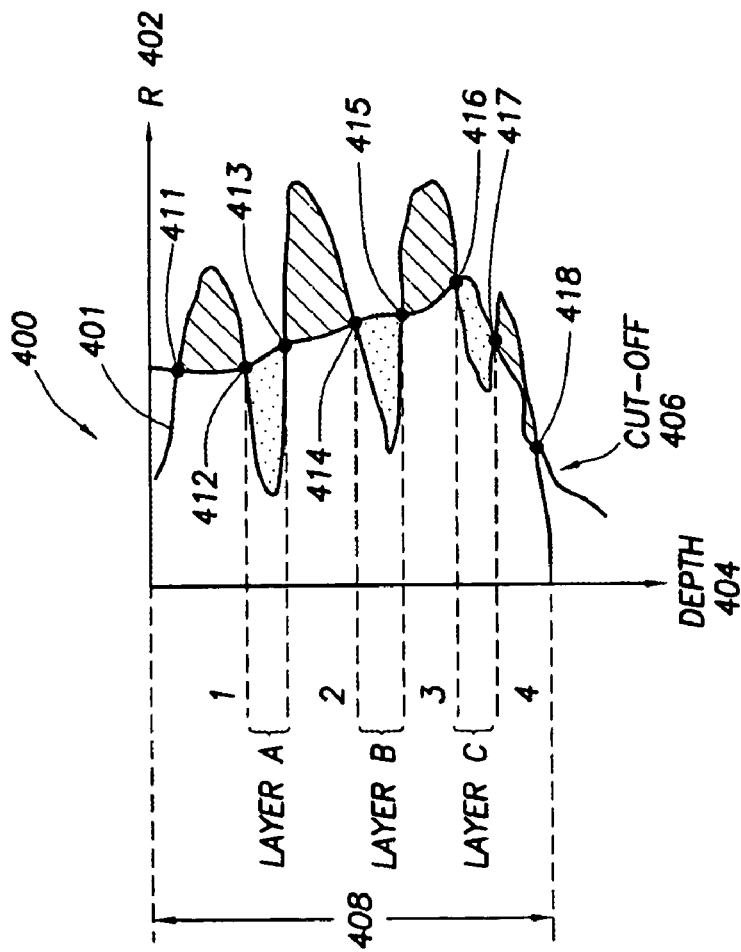
FIG. 2 shows a high-resolution resistivity measurement used to determine a volume fraction of a relative-lower-resistivity layer in accord with the invention.

FIG. 2 shows a high-resolution resistivity measurement that is used to determine bed boundaries in accordance with an embodiment of the invention. As shown, a high-resolution resistivity log (400) includes a high-resolution resistivity curve (401) that represents the high-resolution resistivity measurement plotted against the y-axis (404) that indicates the borehole axial depth at which the resistivity was measured. The x-axis (402) in this plot indicates relative resistivities.

Also shown on the high-resolution resistivity curve (401) are inflection points 411–418 as determined by taking derivatives of the high-resolution resistivity curve (401). As noted above, these inflection points 411–418 represent the bed boundaries between layers of different resistivities. As shown in FIG. 2, these inflection points (bed boundaries) define three relative-lower-resistivity layers A, B, C interleaved with relative-higher-resistivity layers 1, 2, 3, 4. According to this example, $VF_{lr}$ may be calculated by the sum of the thicknesses of layers A, B, and C divided by the sum of the thicknesses of layer A, B, C, 1, 2, 3 and 4.

In an alternative embodiment, the bed boundaries may be approximated as points (not shown) defining the full width half maximum (FWHM) of peaks on the high-resolution resistivity curve (401). The thicknesses of the alternating layers of relative-lower-resistivity defined by these points are then summed to give the $VF_{lr}$ in a manner similar to that described for the inflections points 411–418.

In yet another embodiment, a cutoff curve (406) may be calculated based on a selected criterion, such as a curve linking the inflection points 411–418 or the FWHM points. Alternatively, the cutoff curve (406) may be a low-resolution resistivity curve acquired with a low-resolution tool and having its magnitudes adjusted to be comparable to that of the high-resolution resistivity curve (401). With the cutoff curve (406) defining layers of different resistivities, $VF_{lr}$ may be calculated as:

$$VF_{lr} = \frac{TH_{lr}(R_{High\_Resolution})}{TH_{SW}}. \quad (4)$$

In one embodiment of the invention, $TH_{lr}(R_{High\_Resolution})$ corresponds to the sum of the thicknesses of all the layers where the high-resolution resistivity curve (401) is lower than the cutoff curve (406) within an index interval (sliding window). Accordingly, $TH_{SW}$ corresponds to the thickness of all the layers within an index interval (sliding window), i.e., the thickness of the sliding window. Once the $VF_{lr}$ is determined, the resistivities of the two layers, $R_{hr}$ and $R_{lr}$ may be determined by solving Equations (1) (3). In one embodiment, Equations (1) (3) may be rearranged to give Equations (5) and (6) to facilitate this calculation.

$$R_{lr} = \frac{R_p + (2VF_{lr} - 1)R_h}{2VF_{lr}} - \sqrt{\left(\frac{R_p + (2VF_{lr} - 1)R_h}{2VF_{lr}}\right)^2 - R_h R_p} \quad (5)$$

$$R_{hr} = \frac{R_p - R_{lr} \times VF_{lr}}{1 - VF_{lr}}. \quad (6)$$

The calculated values of $R_{hr}$ and $R_{lr}$ are then combined with $\phi_T$ (the total porosity) to compute BVH and $S_{wt}$ using the equations similar to the Archie-type equations, for example, Equations (7) and (8):

$$BVH = \phi_T - \left[(1 - VF_{lr})\sqrt{\frac{R_w}{R_{hr}}} + VF_{lr}\sqrt{\frac{R_w}{R_{lr}}}\right] \quad (7)$$

$$S_{wt} = 1 - \frac{\phi_T - \left[(1 - VF_{lr})\sqrt{\frac{R_w}{R_{hr}}} + VF_{lr}\sqrt{\frac{R_w}{R_{lr}}}\right]}{\phi_T}. \quad (8)$$

Note that in these computations, only the total porosity $\phi_T$ is used. There is no need to separate the porosities of the relative-higher-resistivity and relative-lower-resistivity layers, $\phi_{hr}$ and $\phi_{lr}$. That is, embodiments of the invention do not rely on porosities of the individual layers and, therefore, no error is introduced by improper assumptions. The total porosity $\phi_T$ may be obtained from conventional logging operations as known in the art.

Equations (7) and (8) assume that the layers contain one type of water, or the free water resistivity is more or less equal to the clay bound water resistivity. In this case, the Archie equation can be used (according to the Archie equation, $$\phi_w = \phi_{elec} = \sqrt{\frac{R_w}{R_t}},$$

where, $\phi_w$ and $\phi_{elec}$ is the water porosity and electrical porosity of the formation, $R_w$ is the water resistivity, and $R_t$ is the true resistivity of the formation). If the free water resistivity is not more or less equal to the clay bound water resistivity, the dual-water model may be more appropriate. According to the dual-water model, $$\phi_w = \phi_{elec} = \sqrt{\frac{R_{we}}{R_t}}, \quad (9)$$

where $\phi_w$ and $\phi_{elec}$ is the water porosity and electrical porosity of the formation, $R_{we}$ is the effective water resistivity, and $R_t$ is the true resistivity of the formation. Equation (9) is analogous to the Archie equation. The effective water conductivity (1/$R_{we}$ or $C_{we}$) may be defined as:

$$\frac{1}{R_{we}} = C_{we} = \left(\frac{S_{wt} - S_{wcl}}{S_{wt}}\right)C_w + \left(\frac{S_{wcl}}{S_{wt}}\right)C_{elec} \qquad (10)$$
$$= (1 - VF_{elec})C_w + VF_{elec}C_{clw},$$

where $S_{wt}$ is the total water saturation, $S_{wcl}$ is the clay water saturation, $C_w$ is the free water conductivity, $C_{clw}$ is the clay bound water conductivity, and $VF_{clw}$ is the volume fraction of clay bound water. $C_{we}$ may be determined using nuclear magnetic resonance (NMR) data as known in the art. For example, $C_{we}=(1-VF_{clw})C_w+VF_{clw}C_{clw}$, where $VF_{clw}=BFV_{cl}/BFV$, $BFV_{cl}$ is clay bound water volume, BFV is clay and capillary bound water volume. $C_w$ may be determined from a water reservoir, and $C_{clw}$ may be computed from pure shale.

Once the effective water conductivity ($C_{we}$ or 1/$R_{we}$) is determined, the total water saturation ($S_{wt}$) may be obtained as:

$$S_{wt} = 1 - \frac{\phi_T - \left[(1-VF_{lr})\sqrt{\frac{R_{wt}}{R_{hr}}} + VF_{lr}\sqrt{\frac{R_{wt}}{R_{lr}}}\right]}{\phi_T}. \qquad (11)$$

Finally, the bulk hydrocarbon volume (BVH) may be computed from the total porosity ($\phi_T$) and the total water saturation ($S_{wt}$): $BVH = \phi_T(1-S_{wt})$.

Figure 3:
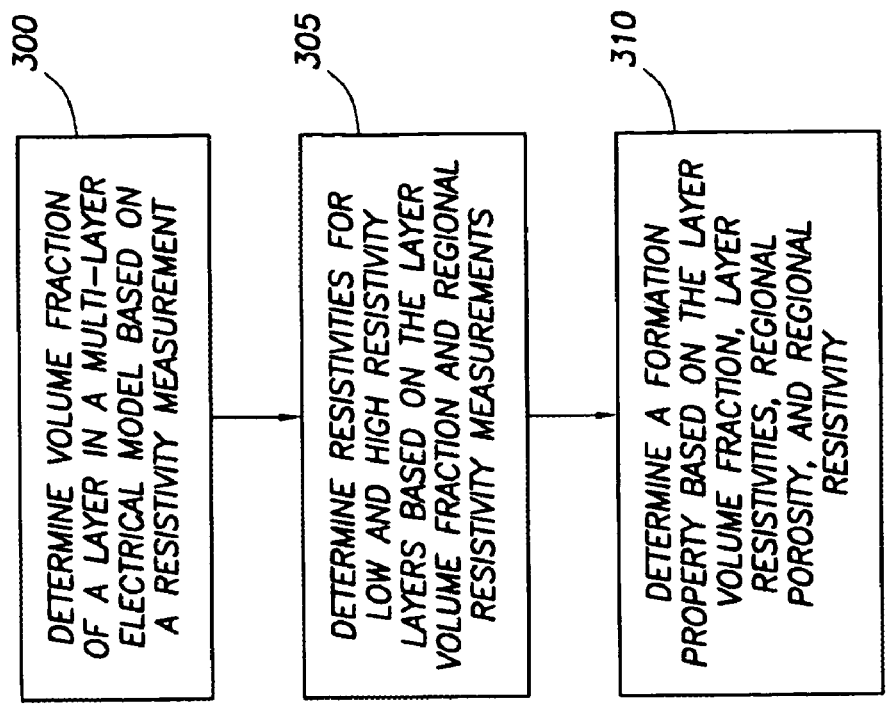
FIG. 3 shows a flow chart of a process in accord with the invention.

FIG. 3 shows a flow chart illustrating a process of the invention. Initially, a volume fraction of a layer in a multi-electrical-layer model is determined for an anisotropic region of the formation, wherein the multi-electrical-layer model includes a relative-lower-resistivity layer and a relative-higher-resistivity layer and the determining is based on a resistivity measurement (Step 300). A resistivity for the relative-lower-resistivity layer and a resistivity for the relative-higher-resistivity layer are also determined based on the volume fraction and bulk resistivity measurements of the anisotropic region, wherein the bulk resistivity measurements include a horizontal resistivity measurement or a vertical resistivity measurement (Step 305). The formation property is then determined based on the volume fraction, the resistivity of the relative-lower-resistivity layer, the resistivity of the relative-higher-resistivity layer, a porosity measurement of the anisotropic region, and the bulk resistivity measurements (Step 310).

The bulk resistivity measurements include vertical resistivity ($R_v$) measurements and horizontal resistivity ($R_h$) measurements acquired using any tool capable of providing the $R_v$ and $R_h$ resistivities as known in the art, including conventional EM induction or propagation resistivity tools.

A high-resolution resistivity measurement is preferred in Step 300. Those skilled in the art will appreciate that embodiments of the invention may use any conventional high-resolution resistivity measurement tools, e.g., tools sold under the trade names of FMI™, RAB/GVR™, SHDT™, OBMI™, OBDT™ by Schlumberger Technology Corporation (Houston, Tex.). For example, if wireline tools are used with a water based mud, then FMI™ or SHDT™ may be used to obtain a high-resolution resistivity measurement. If wireline tools are used with an oil based mud, then OBMI™ or OBDT™ may be used to obtain a high-resolution resistivity measurement. If LWD tools are used in a water-based mud, then RAB™ may be used to obtain a high-resolution resistivity measurement. If LWD tools are used in an oil based mud, then a micro-induction type of high-resolution resistivity sensor such as the OBDT™ sensor may be used to obtain a high-resolution resistivity measurement.

Note that whether the high-resolution is acquired before, at the same time, or after the acquisition of the bulk resistivity measurements is immaterial to embodiments of the invention. The high-resolution resistivity measurement is usually not calibrated, and thus the resistivity values are only meaningful in a relative sense. Even after calibration, these high-resolution resistivity curves often do not represent true formation resistivities because the high-resolution resistivity measurements are typically acquired in regions close to the borehole and are likely contaminated by the drilling fluids. Because the high-resolution resistivity curve is only used to calculate a volume fraction of the relative-lower-resistivity layers (or the relative-higher-resistivity layers) according to embodiments of the invention, it is not critical that the high-resolution resistivity measurement reflect true formation resistivities or relative resistivities, i.e., accurate resistivity values are not required to implement the invention.

Embodiments use the resistivity measurement to derive a volume fraction of the relative-lower-resistivity layers, $VF_{lr}$, (or the relative-higher-resistivity layers, $VF_{hr}$). As noted above, $VF_{lr}$ may be derived using one of several methods. For example, the bed boundaries between layers of different resistivities may be identified as inflection points on a derivative curve of the high-resolution resistivity curve. The thicknesses of the relative-lower-resistivity layers are then summed and divided by the total bed thickness to give the $VF_{lr}$. Alternatively, a cutoff curve may be determined and used to derive the $VF_{lr}$, for example, according to Equation (4).

The described measurements and the $VF_{lr}$ determined are used to calculate the electrical properties (e.g., resistivities, $R_{lr}$ and $R_{hr}$) of both the relative-lower-resistivity and the relative-higher-resistivity layers. The $R_{lr}$ and $R_{hr}$ may be determined according to Equations (5) and (6) described above. $R_{lr}$ and $R_{hr}$ are determined with actual electrical logging data (high-resolution electrical measurements and $R_v$ and $R_h$), and no assumption or estimate of an additional parameter is required in deriving these values. Thus, the obtained $R_{lr}$ and $R_{hr}$ values are more reliable and no error is introduced by improper assumptions or improper geological models.

The $R_{lr}$ and $R_{hr}$ together with the total porosity ($\phi_T$) are used to derive the total water saturation, $S_{wt}$, and the bulk hydrocarbon volume (BVH). These calculations may be accomplished as shown in Equations (7) and (8) or Equation (11), depending on the water model. Again, note that the $S_{wt}$ and BVH are determined from the obtained data and the derived $R_{lr}$ and $R_{hr}$; no assumed value is required. Thus the techniques of the invention provide more reliable determination of these parameters.

Figure 4:
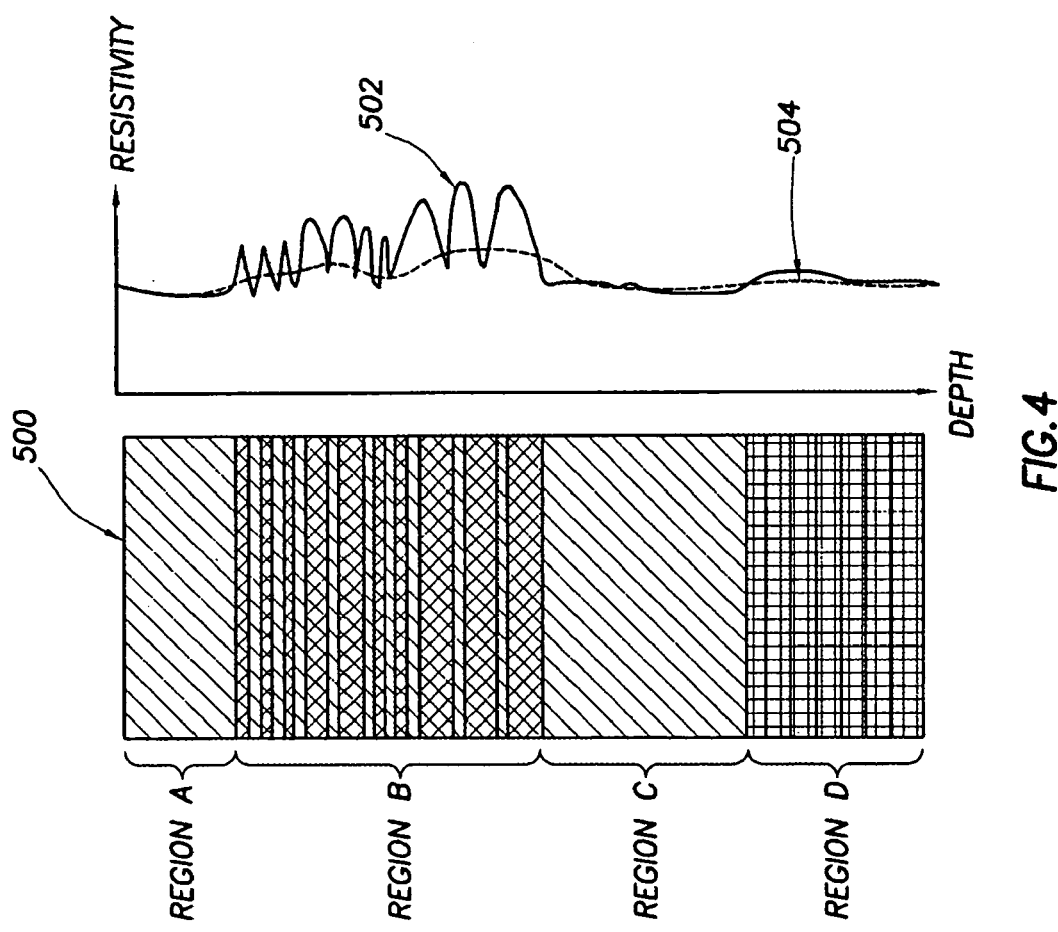
FIG. 4 shows high-resolution and low-resolution resistivity measurements of a formation comprising isotropic regions and anisotropic regions in accord with the invention.

Those skilled in the art will appreciate that the techniques of the invention may be applied to formations including isotropic and anisotropic regions. For example, referring to FIG. 4, formation (500) includes four regions (A, B, C, and D). Each region includes one or more layers. Further, regions A, C, and D are isotropic, while region B includes thin layers that have different resistivites. Accordingly, high-resolution resistivity measurements (502) of regions A, C, and D do not exhibit significant variance from the corresponding low resistivity measurements (504). However, the high-resolution resistivity measurements (502) of region B shows significant variations from the corresponding low-resistivity measurements (504). The existence of variance between the high-resolution resistivity measurements (502) and the low-resolution resistivity measurements (504) indicates that the region is anisotropic.

Techniques of the invention involve determining $VF_{lr}$ by locating bed boundaries from the high-resolution resistivity measurements. These methods are not aimed at identifying boundaries in regions A, C, and D shown in FIG. 4, but will find bed boundaries in Region B. Thus the techniques of the invention may be applied to any formation in general, with formations including anisotropic regions being resolved into layers having different electrical properties and isotropic regions not being affected.

The above description is based on electric models having two types of formation layers having different resistivities. Note that the two "type" of electrical layers may include more than two types of geological layers. Depending on the resolution of the high resolution resistivity measurement, one may dissect the anisotropic region into smaller regions and use the multi-electrical-layer models disclosed herein to solve the electrical properties of each smaller region.

Figure 5:
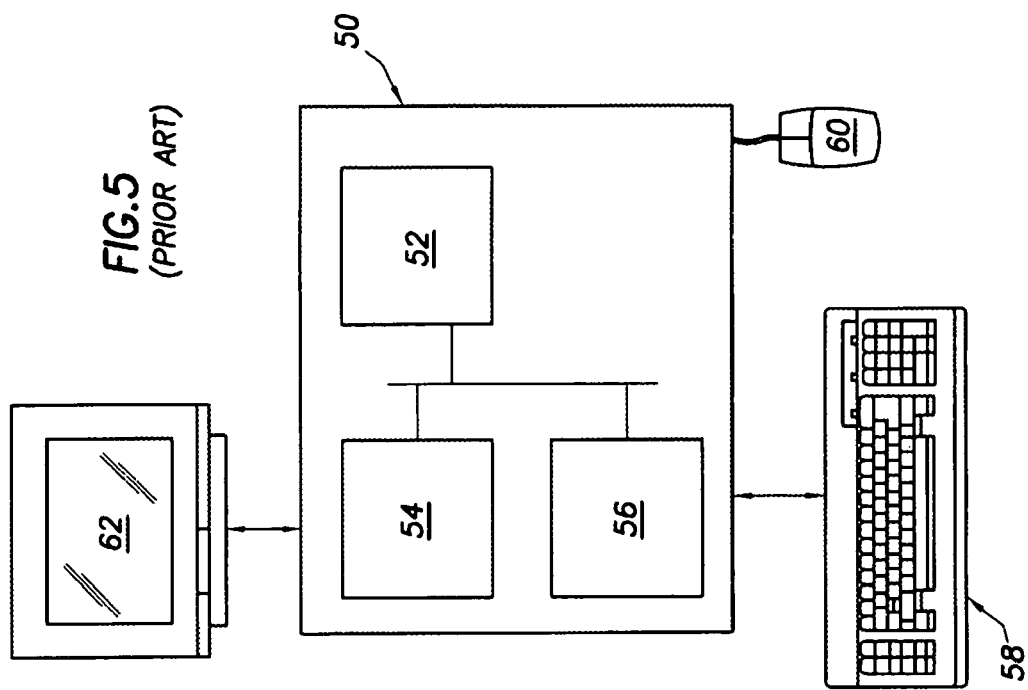
FIG. 5 shows a conventional computer system that may be used to implement a system according to the invention.

Some embodiments of the invention relate to systems for performing the techniques described above. A system of the invention may be a stand-alone unit for performing methods of the invention or may be incorporated in a drilling tool (i.e., an onboard processor unit). A system in accordance with the invention typically includes a processor and a memory. In some embodiments, a system may be implemented on a general-purpose computer having a processor, a memory, and may optionally include other hardware. For example, as shown in FIG. 5, a typical computer (50) includes a processor (52), a random access memory (54), and a storage device (e.g., permanent memory or hard disk) (56). The computer (50) may also include input means, such as a keyboard (58) and a mouse (60), and output means, such as a monitor (62). Note that the general-purpose computer is only for illustration and embodiments of the invention may take other forms (e.g., integrated in a logging tool, not shown). Note also this process can be carried out during or after the data acquisition. In case of while-drilling applications, the process can be either performed on surface with data sent uphole in real-time via telemetry and/or downhole on acquired data and then sending the processed results to surface via telemetry. Note also that this process can be implemented as part of a general formation evaluation program or as an independent evaluation program by itself.

In a system in accordance with the invention, the memory stores a program readable by the processor. The program may include instructions for performing the above described methods, e.g., determining a volume fraction for a layer in an anisotropic formation based on a high-resolution resistivity measurement; determining formation electrical properties based on the volume fraction and bulk resistivity measurements that include horizontal resistivity and vertical resistivity measurements; calculating formation total water saturation based on the electrical properties of the formation; and determining a bulk hydrocarbon volume of the formation.

A system in accordance with the invention provides new and improved techniques to evaluate the properties of anisotropic reservoirs in real time. The programming may be accomplished through the use of one or more program storage devices readable by the computer processor and encoding one or more programs of instructions executable by the computer for performing the operations described herein. The program storage device may take the form of, for example, one or more floppy disks; a CDROM or other optical disk; a magnetic tape; a read-only memory chip (ROM); and other forms of the kind well known in the art. The program of instructions may be in "object code," i.e., in binary form that is executable more-or-less directly by the computer; in "source code" that re-quires compilation or interpretation before execution; or in some intermediate form such as partially compiled code. The precise forms of the program storage device and of the encoding of instructions are immaterial here.

The present invention provides several advantages. Methods of the invention provide a general approach to correctly translate $R_v$ and $R_h$ into $S_{wt}$ for anisotropic formations. The methods are based on multi-resistivity-layer electrical models which are compatible with multi-geological-layer formations. Methods of the invention focus on the real cause of resistivity anisotropy: the different resistivity values, rather than the different formation compositions. Accordingly, the disclosed technique simplifies a wide range of geological models into a single calculation model (i.e., an "electrical" model) that may simply include a relative-higher-resistivity layer ($R_{hr}$) and a relative-lower-resistivity layer($R_{lr}$). These methods do not rely on the assumption of "$\phi_{lr}=\phi_{hr}=\phi_T$." The methods include high-resolution resistivity measurements to derive a volume fraction of a layer; no assumed value is used to solve the electrical properties of the formation layers. Further, the techniques may be used to obtain continuous $R_{lr}$ and $R_{hr}$ curves without problems because $R_{hr}$ is always greater than $R_{lr}$ according to the electrical models.

While the invention has been described with respect to a limited number of embodiments, those skilled in the art, having benefit of this disclosure, will appreciate that other embodiments can be devised which do not depart from the scope of the invention as disclosed herein. The present invention may be implemented using conventional EM logging instruments and in general oilfield operations such as while-drilling, wireline applications, coiled tubing operations, while-tripping, monitoring applications, etc. It will also be appreciated that the present invention may be implemented in conjunction with other models to determine subsurface properties as known in the art.

What is claimed is:

1. A method for determining a surface formation property, comprising:
    determining a volume fraction of a layer in a multi-electrical-layer model for an anisotropic region of the formation, wherein the multi-electrical-layer model includes a relative-lower-resistivity layer and a relative-higher-resistivity layer and the determining is based on a resistivity measurement;
    determining a resistivity for the relative-lower-resistivity layer and a resistivity for the relative-higher-resistivity layer based on the volume fraction and bulk resistivity measurements of the anisotropic region, wherein the bulk resistivity measurements include a horizontal resistivity measurement or a vertical resistivity measurement; and
    determining the formation property based on the volume fraction, the resistivity of the relative-lower-resistivity layer, the resistivity of the relative-higher-resistivity layer, a porosity measurement of the anisotropic region, and the bulk resistivity measurements.

2. The method of claim 1, wherein the formation property is a total water saturation.

3. The method of claim 2, wherein the water saturation is determined according to:

$$S_{wt} = 1 - \frac{\phi_T - \left[(1-VF)\sqrt{\frac{R_w}{R_{hr}}} + VF\sqrt{\frac{R_w}{R_{lr}}}\right]}{\phi_T}$$

wherein $S_{wt}$ is the total water saturation, $\phi_T$ is the total porosity of the anisotropic region, VF is the volume fraction of the relative-lower-resistivity layer, $R_{hr}$ is the resistivity of the relative-higher-resistivity layer, $R_{lr}$ is the resistivity of the relative-lower-resistivity layer, and $R_w$ is a resistivity of formation water.

4. The method of claim 1, wherein the formation property is a bulk hydrocarbon volume.

5. The method of claim 4, wherein the bulk volume of hydrocarbon is determined according to:

$$BVH = \phi_T - \left[(1-VF)\sqrt{\frac{R_w}{R_{hr}}} + VF\sqrt{\frac{R_w}{R_{lr}}}\right]$$

wherein BVH is the bulk hydrocarbon volume, $\phi_T$ is the total porosity of the anisotropic region, VF is the volume fraction of the relative-lower-resistivity layers, $R_{hr}$ is the resistivity of the relative-higher-resistivity layer, $R_{lr}$ is the resistivity of the relative-lower-resistivity layer, and $R_w$ is a resistivity of formation water.

6. The method of claim 1, wherein the volume fraction is of the relative-lower-resistivity layer.

7. The method of claim 1, wherein the resistivity measurement is a high-resolution measurement.

8. The method of claim 7, wherein the determination of a volume fraction includes identifying bed boundaries based on the high-resolution resistivity measurement.

9. The method of claim 8, wherein identifying the bed boundaries includes finding inflection points on a derivative curve of the high-resolution resistivity measurement as a function of a borehole axial depth.

10. The method of claim 1, wherein the volume fraction is determined by summing thicknesses of thin layers having similar electrical properties.

11. The method of claim 1, wherein determination of the formation property is further based on a dual-water model or NMR data.

12. The method of claim 1, wherein the volume fraction or the formation property is determined within a depth or time index interval.

13. A system for determining a subsurface formation property, comprising:
a compute adapted to process a program including instructions for: determining a volume fraction of a layer in a multi-electrical-layer model for an anisotropic region of the formation, wherein the multi-electrical-layer model comprises a relative-lower-resistivity layer and a relative-higher-resistivity layer and the determining is based on a resistivity measurement;
determining a resistivity for the relative-lower-resistivity layer and a resistivity for the relative-higher-resistivity layer based on the volume fraction and bulk resistivity measurements of the anisotropic region, wherein the bulk resistivity measurements include a horizontal resistivity measurement or a vertical resistivity measurement; and
determining the formation property based on the volume fraction, the resistivity of the relative-lower-resistivity layer, the resistivity of the relative-higher-resistivity layer, a porosity measurement of the anisotropic region, and the bulk resistivity measurements.

14. The system of claim 13, wherein the formation property is a total water saturation.

15. The system of claim 14, wherein the water saturation is determined according to:

$$S_{wt} = 1 - \frac{\phi_T - \left[(1-VF)\sqrt{\frac{R_w}{R_{hr}}} + VF\sqrt{\frac{R_w}{R_{lr}}}\right]}{\phi_T}$$

wherein $S_{wt}$ is the total water saturation, $\phi T$ is the total porosity of the anisotropic region, VF is the volume fraction of the relative-lower-resistivity layer, $R_{hr}$ is the resistivity of the relative-higher-resistivity layer, $R_{lr}$ is the resistivity of the relative-lower-resistivity layer, and $R_w$ is a resistivity of formation water.

16. The system of claim 13, wherein the formation property is a bulk hydrocarbon volume.

17. The system of claim 16, wherein the bulk volume of hydrocarbon is determined according to:

$$BVH = \phi_T - \left[(1-VF)\sqrt{\frac{R_w}{R_{hr}}} + VF\sqrt{\frac{R_w}{R_{lr}}}\right]$$

wherein BVH is the bulk hydrocarbon volume, $\phi T$ is the total porosity of the anisotropic region, VF is the volume fraction of the relative-lower-resistivity layer, $R_{hr}$ is the resistivity of the relative-higher-resistivity layer, $R_{lr}$ is the resistivity of the relative-lower-resistivity layer, and $R_w$ is a resistivity of formation water.

18. The system of claim 13, wherein the volume fraction is of the relative-low-resistivity layer.

19. The system of claim 13, wherein the resistivity measurement is a high-resolution measurement.

20. The system of claim 19, wherein determination of a volume fraction includes identifying bed boundaries based on the high-resolution resistivity measurement.

21. The system of claim 20, wherein identifying the bed boundaries includes finding inflection points on a derivative curve of the high-resolution resistivity measurement as a function of a borehole axial depth.

22. The system of claim 13, wherein the volume fraction is determined by summing thicknesses of thin layers having similar electrical properties.

23. The system of claim 13, wherein determination of the formation property is based on a dual-water model or NMR data.

24. The system of claim 13, wherein the volume fraction or the formation property is determined within a depth or time index.

* * * * *